US008210210B2

(12) United States Patent
Clark et al.

(10) Patent No.: US 8,210,210 B2
(45) Date of Patent: Jul. 3, 2012

(54) SYSTEM AND METHOD FOR MODULAR REPAIR OF PIPE LEAKS

(75) Inventors: John W. Clark, Houston, TX (US); Jerry Robb, La Porte, TX (US)

(73) Assignee: Colt Services, LP, La Porte, TX (US)

( * ) Notice: Subject to any disclaimer, the term of this patent is extended or adjusted under 35 U.S.C. 154(b) by 222 days.

(21) Appl. No.: 12/829,268

(22) Filed: Jul. 1, 2010

(65) Prior Publication Data
US 2011/0023975 A1    Feb. 3, 2011

Related U.S. Application Data

(60) Provisional application No. 61/222,459, filed on Jul. 1, 2009.

(51) Int. Cl.
*F16L 55/16* (2006.01)

(52) U.S. Cl. .............. 138/99; 138/97; 285/373; 285/15; 156/94; 264/36.1

(58) Field of Classification Search .................... 138/99, 138/97; 285/15, 373, 197, 93; 164/26.1; 156/94
See application file for complete search history.

(56) References Cited

U.S. PATENT DOCUMENTS

| 12,708 | A | * | 4/1855 | Stone ........................ 408/23 |
|---|---|---|---|---|
| 631,867 | A | * | 8/1899 | Beaver ........................ 138/99 |
| 732,400 | A | * | 6/1903 | Dresser ....................... 138/99 |
| 3,396,753 | A | * | 8/1968 | Foster et al. ................. 138/99 |
| 3,517,701 | A | * | 6/1970 | Smith .......................... 138/97 |
| 3,861,422 | A | * | 1/1975 | Christie ....................... 138/99 |
| 3,944,260 | A | * | 3/1976 | Petroczky ..................... 285/15 |
| 3,954,288 | A | * | 5/1976 | Smith .......................... 285/93 |
| 4,049,296 | A | | 9/1977 | Harrison ....................... 285/15 |
| 4,133,351 | A | | 1/1979 | Harrison et al. ................ 138/97 |
| 4,171,142 | A | | 10/1979 | Harrison ....................... 285/10 |
| 4,209,029 | A | | 6/1980 | Pennington .................. 137/15.11 |
| 4,544,188 | A | | 10/1985 | Dugger ......................... 285/337 |
| 4,568,091 | A | | 2/1986 | Harrison ....................... 277/616 |
| 4,576,401 | A | | 3/1986 | Harrison ....................... 277/615 |
| 4,580,788 | A | | 4/1986 | Rabe et al. .................... 277/622 |
| 4,709,729 | A | | 12/1987 | Harrison ....................... 138/99 |

(Continued)

OTHER PUBLICATIONS

Team, Inc., Pipe Repairs, Inc., "Insert-A-Size Enclosures, Clamps," (excerpt from company binder), 1997, 8 pages (not numbered).

(Continued)

*Primary Examiner* — Patrick F Brinson
(74) *Attorney, Agent, or Firm* — Chowdhury & Georgakis, P.C.

(57) ABSTRACT

A method and apparatus for modular pipe repair, the method comprising attaching two enclosure halves over a leak in a pipe to assemble a first repair enclosure and determining if another repair enclosure is needed for another leak in the pipe. If another repair enclosure is needed, the method further comprises drilling in the first repair enclosure drill hole passages in selected angled grooves thereof to connect to a primary groove in the enclosure, attaching a second repair enclosure to pipe, drilling in the second repair enclosure drill hole passages in selected angled grooves thereof to connect to the primary groove in the second enclosure, and attaching hub clamps to the first repair enclosure and the second repair enclosure. Finally, the method comprises injecting sealant into a plurality of injection points to fill the selected angled grooves and the primary grooves in the repair enclosures.

19 Claims, 11 Drawing Sheets

U.S. PATENT DOCUMENTS

| | | | |
|---|---|---|---|
| 4,721,330 A | | 1/1988 | Woodouse |
| 4,768,813 A | * | 9/1988 | Timmons ................. 285/373 |
| 4,790,058 A | * | 12/1988 | Miller ................. 29/407.08 |
| 4,895,397 A | * | 1/1990 | Miller ................. 285/419 |
| 5,066,053 A | * | 11/1991 | Miller ................. 285/373 |
| 5,118,139 A | | 6/1992 | Lott ................. 285/15 |
| 5,853,030 A | * | 12/1998 | Walding ................. 138/99 |
| 5,899,507 A | | 5/1999 | Schroeder et al. ................. 285/343 |
| 5,918,639 A | * | 7/1999 | Ottestad et al. ................. 138/99 |
| 5,950,683 A | * | 9/1999 | Henderson et al. ................. 138/99 |
| 6,131,597 A | | 10/2000 | Mendicino et al. ................. 137/15.14 |
| 6,220,302 B1 | * | 4/2001 | Nolley ................. 138/99 |
| 6,237,640 B1 | * | 5/2001 | Vanderlee ................. 138/99 |
| 6,305,719 B1 | * | 10/2001 | Smith et al. ................. 285/15 |
| 6,685,238 B1 | | 2/2004 | Pouillard ................. 285/337 |
| 6,990,718 B2 | * | 1/2006 | Gregory ................. 29/455.1 |
| 7,617,843 B1 | * | 11/2009 | Al-Oriar ................. 138/99 |
| 7,900,655 B2 | * | 3/2011 | Morton et al. ................. 138/99 |

OTHER PUBLICATIONS

Team, Inc., "Adjustable Bar Clamp," (excerpt from company binder), 1995, 2 pages (not numbered).

Team Environmental Services, Inc., "Team Environmental Services Inc., A Team Inc. Company," (excerpt from company brochure), 1996, pp. 1, 2, 16 and 17.

* cited by examiner

SYSTEM AND METHOD FOR MODULAR REPAIR OF PIPE LEAKS

CROSS REFERENCE TO RELATED APPLICATIONS

This application claims the benefit of the filing date of U.S. provisional patent application No. 61/222,459, incorporated herein by reference, which was filed on Jul. 1, 2009, by the same inventors of this application.

TECHNICAL FIELD OF THE PRESENT DISCLOSURE

The present disclosure relates generally to repair and sealing of pipe leaks. More particularly, the present disclosure relates to modular repair and sealing of leaks in pipelines under pressure.

BACKGROUND OF THE PRESENT DISCLOSURE

Leaks often develop in pipelines along pipe and pipe fitting connections. Environmental factors as well as age and use of the pipe result in deterioration and leaks along the pipe. Problems with thread or weld leaks on screwed or socket-weld connections, at coupling elbows, and unions of the pipeline requiring repair may result in shutdown of the pipeline. After the repair is completed, new leaks along the pipe may occur requiring shutdown and further repair.

Halting the flow of product through the high pressure pipeline for repair of the pipe results in delayed delivery and lost revenue for the pipeline operator. Repairing the pipe as it carries product without shutting down the pipeline eliminates lost revenue and interruptions in product delivery.

SUMMARY OF THE PREFERRED EMBODIMENTS

One or more of the problems outlined above may be solved by the various embodiments of the invention. Broadly speaking, the invention includes systems and methods for repair and sealing of leaks in pipelines under pressure. In one aspect, disclosed is a method for modular pipe repair, comprising: attaching two enclosure halves over a leak in a pipe to assemble a first repair enclosure; attaching enclosure attachment devices to the assembled repair enclosure, wherein each of the enclosure attachment devices is fastener such as a clamping bolt or clamping stud; determining if another repair enclosure is needed for another leak in the pipe, wherein if another repair enclosure is needed: drilling in the first repair enclosure a drill hole passage in each of selected ones of a plurality of angled grooves to connect to a primary groove in the enclosure; attaching a second repair enclosure to pipe; attaching enclosure attachment devices to the assembled second repair enclosure, wherein each of the enclosure attachment devices is fastener such as a clamping bolt or clamping stud; drilling in the second repair enclosure a drill hole passage in each of selected ones of a plurality of angled grooves to connect to the primary groove in the second enclosure; and attaching hub clamps to the first repair enclosure and the second repair enclosure; and if another repair enclosure is not needed: determining if a strongback rod is needed; wherein if a strongback rod is needed: attaching a strongback clamping device to the pipe and the repair enclosure; and attaching a strongback rod to the strongback clamping device; and injecting sealant into a plurality of injection points to fill the selected angled grooves and the primary grooves in the repair enclosure(s), wherein the sealant is a Teflon™ fiber sealant.

In another aspect, a modular pipe repair enclosure comprises: a plurality of enclosure halves, each enclosure half including angled grooves and a primary groove and being made of a solid steel piece; and a plurality of clamping devices, which may include hub clamps, each of which attaches to two enclosure halves, and/or strongback clamping devices, which may be fitted with strongback rods; wherein the enclosure halves and clamping devices are attached to repair one or more leaks in a pipe.

Numerous additional embodiments are also possible.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which the leftmost significant digit(s) in the reference numerals denote(s) the first figure in which the respective reference numerals appear, wherein:

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "attached" is intended to mean either an indirect or direct physical connection. Thus, if a first device attaches to a second device, that connection may be through a direct physical connection, or through an indirect physical connection via other devices and connections. In addition, the term "connect" and grammatical variants thereof are used as follows. If item x is said to be connectable to item y, it is intended that item y is also connectable to item x; the expression "item x is connectable to item y" is used interchangeably with the expression "item y is connectable to item x," and both of these expressions are used interchangeably with the expression "items x and y are interconnectable." Further, the prepositions "to" and "with" are used interchangeably with the term "connect" and grammatical variants thereof. For the sake of convenience and clarity, additional terminological information is provided below at pertinent points in the following description.

DETAILED DESCRIPTION OF ILLUSTRATIVE EMBODIMENTS

Illustrative embodiments of the present claimed subject matter are described in detail below. In the interest of clarity, not all features of an actual implementation are described in this specification. It will of course be appreciated that in the development of any such actual embodiment, numerous implementation specific decisions must be made to achieve the developers' specific goals, such as compliance with system related and business related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
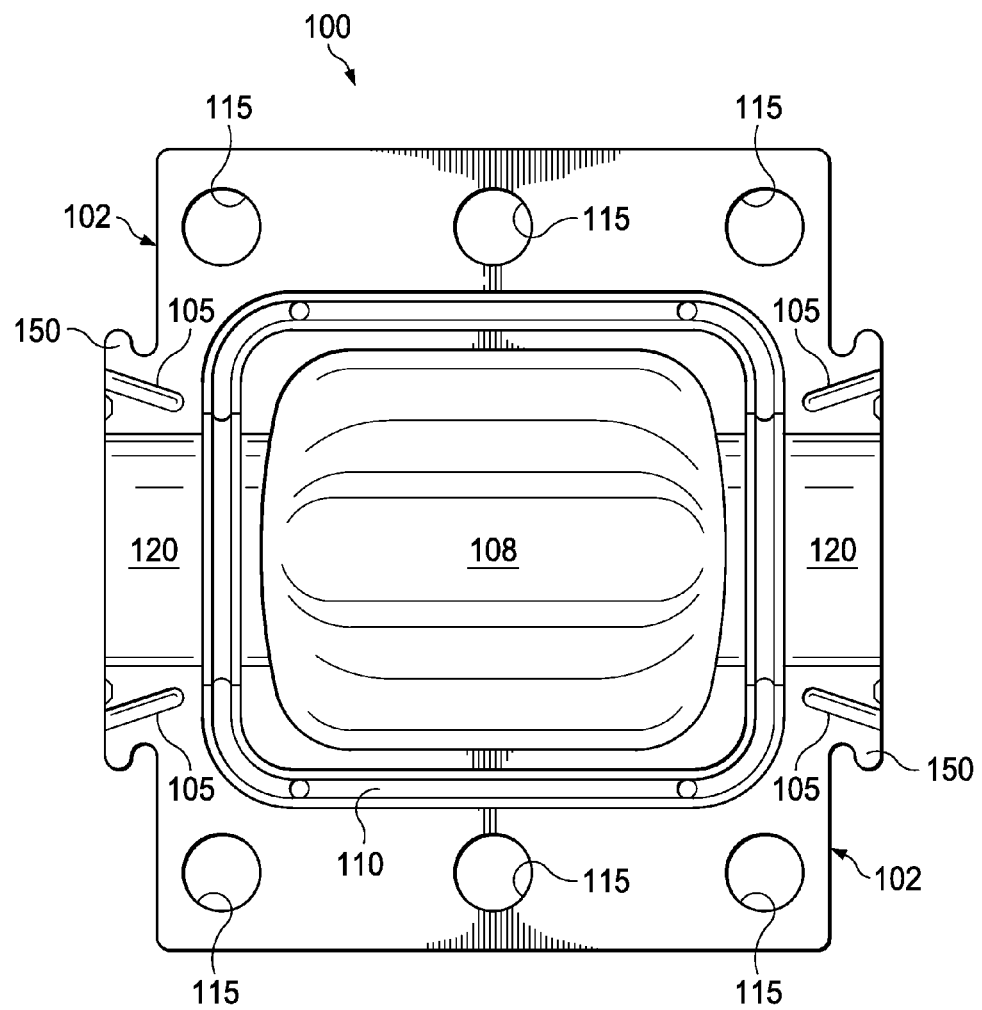
FIG. 1, in accordance with some embodiments of the present disclosure, shows half of an enclosure (an enclosure half) including angled grooves.
Figure 8:
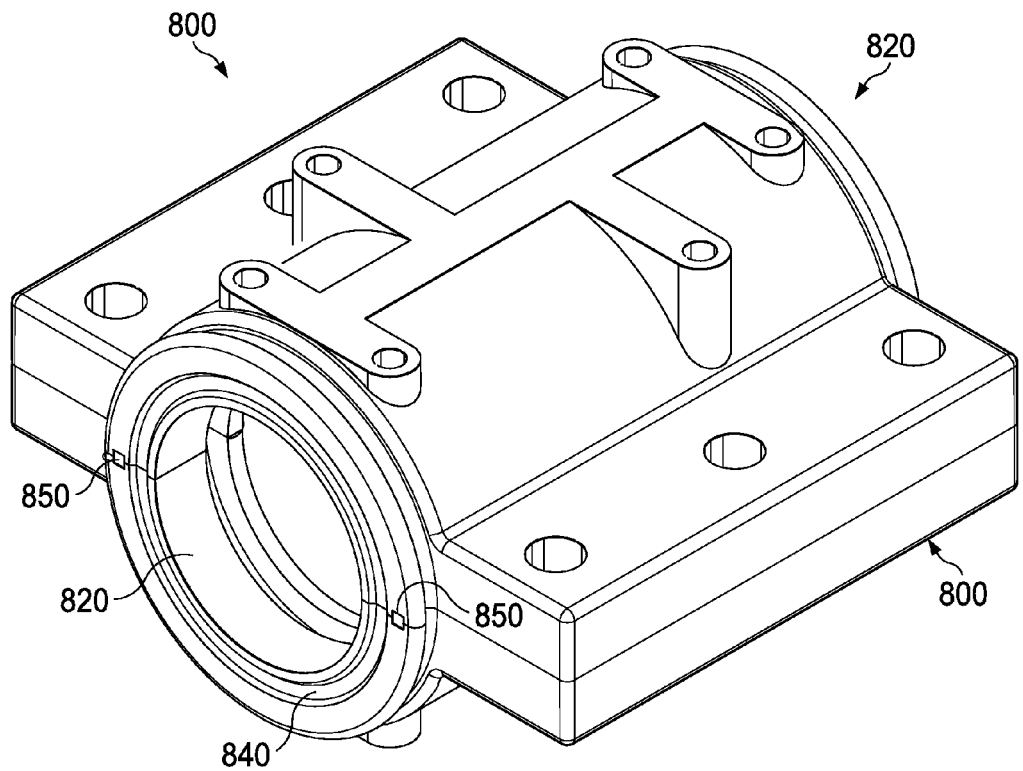
FIG. 8, in accordance with some embodiments of the present disclosure, shows an assembled modular repair enclosure including two enclosure halves joined together.

Turning now to FIG. 1, in accordance with some embodiments of the present disclosure, there is shown an enclosure half 100 (which may also be referred to as half of an enclosure) including angled grooves 105, located in axially opposite end portions called hubs 102. It is noted that the two axially opposite end portions or hubs 102 of enclosure half 100 may collectively be referred to as a single (combined) end portion. Each axially opposite end portion or hub 102 may include an outer lip 150, which will be described further below. As will become understood in view of the subsequent portions of the disclosure hereinbelow, enclosure half 100 may be disposed around a pipe, e.g. axially along and partially circumferentially, e.g. semi-circumferentially, around a pipe, and a pair of opposing enclosure halves 100 may be disposed circumferentially around a pipe to form an enclosure (an example of which is shown in FIG. 8); in this situation the axially opposite end portions or hubs 102 of one of the opposing enclosure halves 100 align, respectively, with the axially opposite end portions or hubs 102 of the other one of the opposing enclosure halves 100. As will be described in more detail with reference to FIG. 12, the enclosure halves 100 may be machined from a solid steel metal piece that in accordance with some embodiments of the invention may be 516-grade 70 steel. The enclosure half 100 may include a void section 108 and a primary groove 110 along the perimeter of the enclosure half 100 extending around the void section 108. As will be understood in view of the subsequent portions of the disclosure hereinbelow, when enclosure half 100 is placed around a pipe, void section 108 constitutes a void between enclosure half 100 and the pipe. The enclosure half 100 may also include clamping holes 115 for fasteners such as clamping bolts (not shown in FIG. 1) and a pipe retainer section 120. In accordance with some embodiments of the present disclosure, the pipe retainer section 120 supports the pipe (not shown in FIG. 1) and the leaking section of pipe may be covered by the void section 108 of the enclosure half 100. As understood from the above discussion, a second enclosure half (not shown in FIG. 1) of identical construction to the first enclosure half 100 is placed over the first enclosure half 100 around the pipe to form an enclosure. The clamping holes 115 are aligned and fasteners such as clamping bolts and nuts (not shown in FIG. 1) are attached to complete the modular repair enclosure.

Figure 5:
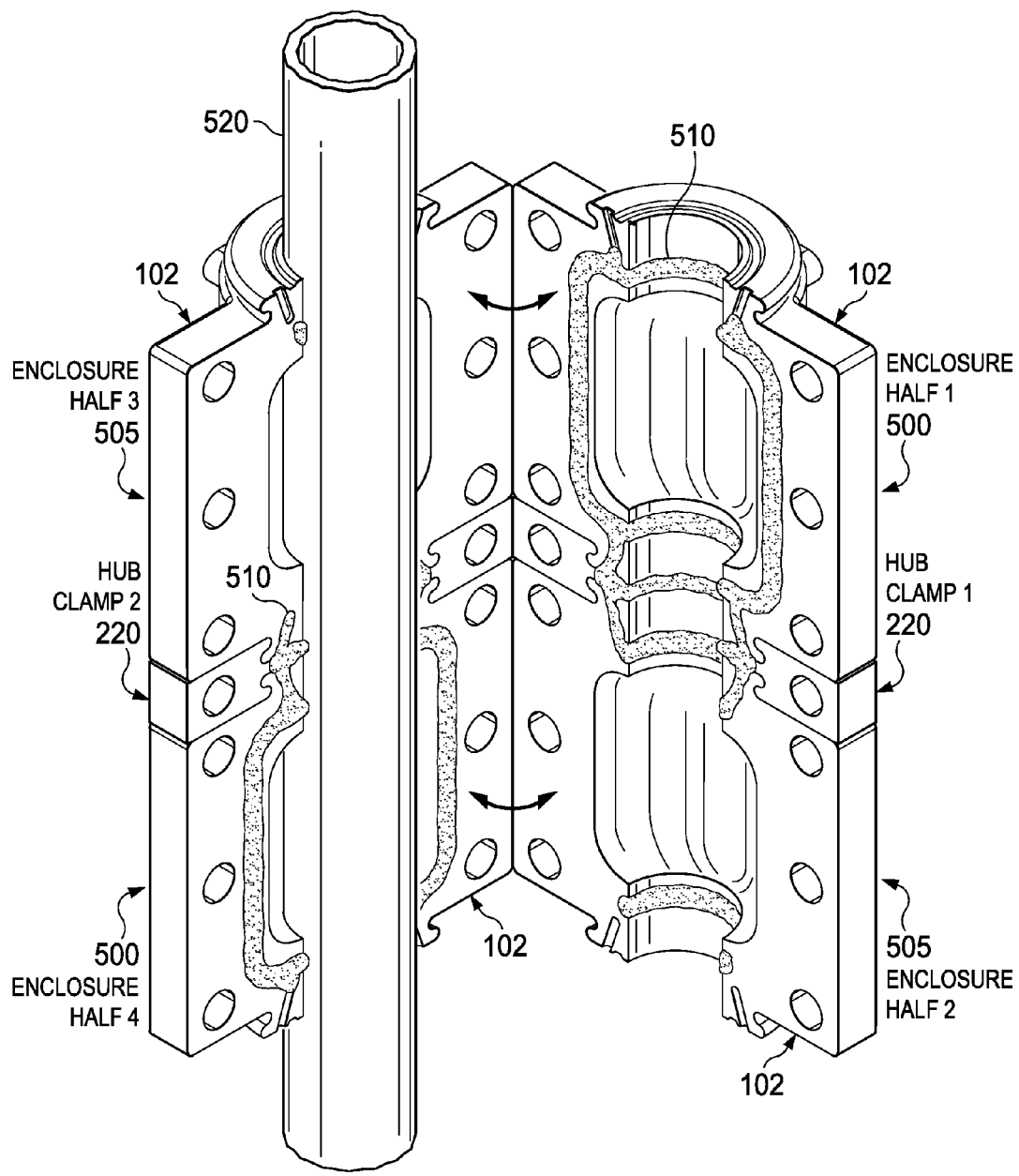
FIG. 5, in accordance with some embodiments of the present disclosure, shows an unassembled modular repair enclosure including two sets of components, each set having two enclosure halves attached by a hub clamp therebetween, the repair enclosure including sealant along grooves and containing a pipe.

The following discussion of terminology and usage applies to the immediately preceding description and throughout the entirety of this document. The expressions "disposed around a pipe," "placed around a pipe," or the like, or grammatical variants thereof, when not further qualified, may refer to the notion of being positioned partly (circumferentially) around a pipe and/or to the notion of being positioned completely (circumferentially) around a pipe. In some cases, context will make clear which of such notions is being referred to, e.g. enclosure half 100, illustrated in FIG. 1, by virtue of its shape, may be positioned partly around a pipe, but not completely around a pipe, whereas two opposed enclosure halves 100, by virtue of their shape in such combination, may be positioned completely around a pipe but not partly around a pipe. Here, it is assumed that the pipe under discussion is one whose outer circumference fits the inner circumference of the opposed enclosure halves. Relatedly, the above expressions may refer to being positioned partly/completely around a portion of a pipe, i.e. a segment of a pipe having an axial extension or length less than that of the entire pipe, it being understood, e.g., that for the technological applications discussed herein a modular repair enclosure will often be shorter (i.e. of lesser axial extension or length) than the pipe upon which it is placed to effect repair thereof (An example of such an axially extended portion of a pipe is shown in FIG. 5.) In this regard, still further relatedly, the expressions "disposed along a pipe," "placed along a pipe," or the like, or grammatical variants thereof, when not further qualified, may refer to the notion of being positioned lengthwise along a portion or segment of a pipe, the portion or segment being of lesser axial extent or length than the entire pipe.

Figure 2:
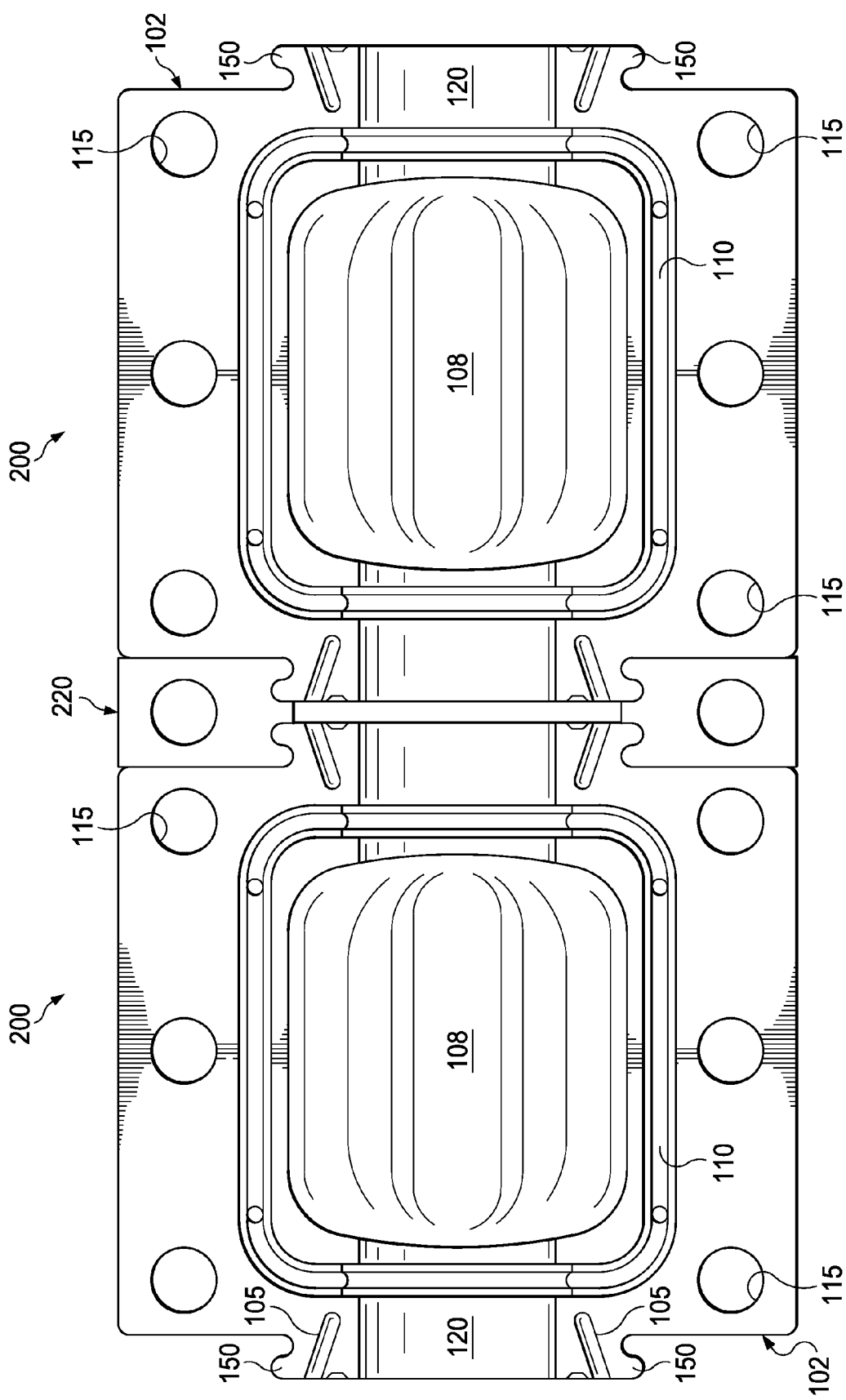
FIG. 2, in accordance with some embodiments of the present disclosure, shows two enclosure halves attached by a hub clamp.

Referring to FIG. 2, two enclosure halves 200 attached by a hub clamp 220, in accordance with some embodiments of the present disclosure, are shown. Each enclosure half 200 may be identical as shown in FIG. 2 and includes a void section 108, pipe retainer sections 120, two axially opposite end portions or hubs 102, outer lips 150, primary groove 110, angled grooves 105, and clamping holes 115. It is noted that the two axially opposite end portions or hubs 102 of enclosure half 200 may collectively be referred to as a single (combined) end portion. The hub clamp 220 connects the two identical enclosure halves 200 shown in FIG. 2 together. Hub clamp 220 may be disposed around a pipe, e.g. axially along and partially circumferentially, e.g. semi-circumferentially, around a pipe. A pair of opposing hub clamps 220 may be disposed circumferentially around a pipe (this may be more easily understood e.g. from FIG. 5).

Figure 3:
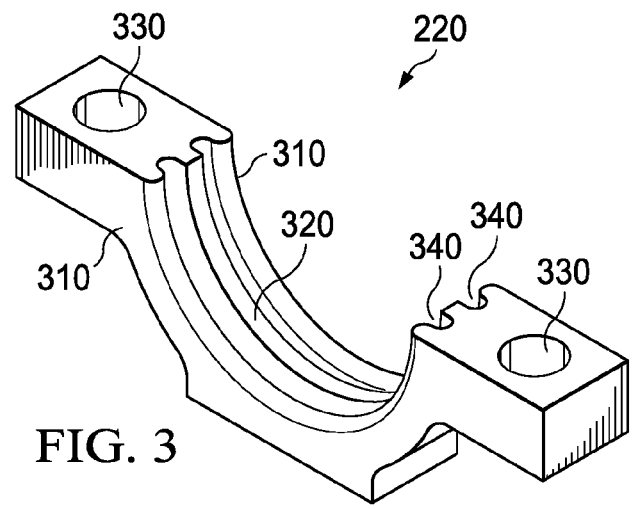
FIG. 3, in accordance with some embodiments of the present disclosure, shows a more detailed view of the hub clamp of FIG. 2.

FIG. 3 shows a more detailed view of the hub clamp 220. As shown in FIG. 3, the hub clamp 220 includes two axially opposite side portions or hubs 310, which are located at axially opposite sides of hub clamp 220 when hub clamp 220 is disposed around a pipe, e.g. partially circumferentially, e.g., semi-circumferentially, around a pipe. Each side portion or hub 310 may include an inner lip 340. In between the two inner lips 340, there is a sealant groove 320. Inner lips 340 and sealant groove 320 are all parallel to one another and run the half-circle length of the semi-circular portion of hub clamp 220. At each end of the hub clamp 220, clamping holes 330 are present that align with the clamping holes 115 of the enclosure halves 200 as shown in FIG. 2. As will become even clearer hereinbelow, each inner lip 340 is matingly connectable to outer lip 150 of enclosure half 200, such that a given enclosure half 200, at either of its two axially opposite end portions or hubs 102, may be matingly connected to a given hub clamp 220, at either of its two side portions or hubs 310. It is noted that, in so connecting a hub clamp 220 to an enclosure half 200 that is disposed around a pipe, the hub clamp 220 is also being disposed around the pipe. It is further noted that, in such mating connection, when an enclosure half 200 and a hub clamp 220 are disposed around a pipe, outer lip 150 of enclosure half 200 is disposed to lie at a radially interior position while inner lip 340 of hub clamp 220 is disposed to lie at a radially exterior position (in other words, outer lip 150 will lie radially between the pipe and inner lip 340). Accordingly, a pair of opposing hub clamps 220 can be matingly connected to one or two pairs of opposing enclosure halves 100 or 200 while the pair(s) of opposing enclosure halves is (are) disposed circumferentially around the pipe. Thus, additional hub clamps and enclosure halves can be connected to pre-existing modular repair enclosures (i.e. enclosure halves or concatenations of enclosure half-hub clamp-enclosure half already attached to the pipe). In this way, modular extensions to the pipe repair system can be made at times later than the installation of initial modular repair enclosures.

Figure 4:
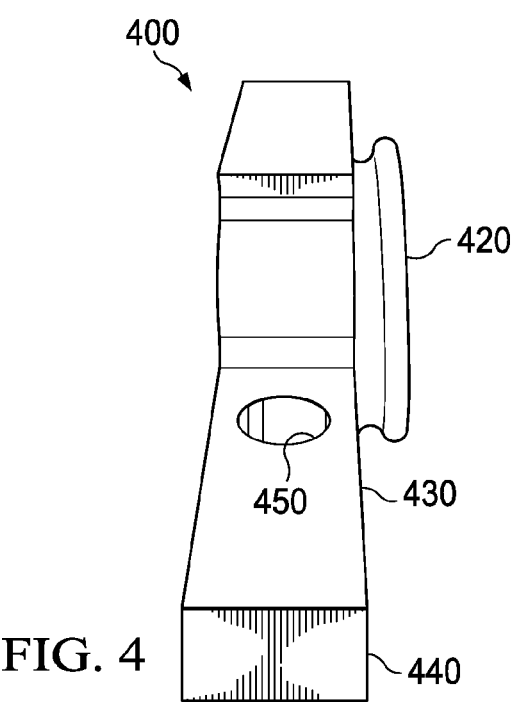
FIG. 4, in accordance with some embodiments of the present disclosure, shows a back view of a strongback clamping device of FIG. 7.

In accordance with some embodiments of the present disclosure, FIG. 4 shows a strongback clamping device 400 as also described in more detail below with reference to FIGS. 7 and 13. Strongback clamping device 400 may be disposed around a pipe, e.g. axially along and partially circumferentially, e.g. semi-circumferentially, around a pipe. A pair of opposing strongback clamping devices 400 may be disposed circumferentially around a pipe. Strongback clamping device 400 includes first side portion or hub 1310 (see FIG. 13) and second side portion or hub 430, which side portions or hubs are axially opposite each other. First side portion or hub 1310 may include an inner lip 1320 (see FIG. 13), and second side portion or hub 430 may include an outer lip 420 (see FIG. 4). Inner lip 1320 is matingly connectable to outer lip 150 of enclosure half 100 or 200, while outer lip 420 is matingly connectable to inner lip 340 of hub clamp 220 shown in FIG. 3. Accordingly, strongback clamping device 400 may be matingly connected, at its first side portion or hub 1310, to enclosure half 100 or 200 and, at its second side portion or hub 430, to hub clamp 220. It is noted that, in so connecting strongback clamping device 400 to an enclosure half 100 or 200 or a hub clamp 220, that is disposed around a pipe, the strongback clamping device 400 is also being placed or disposed around the pipe. In such mating connection, when the components in question are disposed circumferentially around a pipe, outer lip 150 of enclosure half 100 or 200 is disposed to lie at a radially interior position while inner lip 1320 of strongback clamping device 400 is disposed to lie at a radially exterior position (in other words, outer lip 150 will lie radially between the pipe and inner lip 1320), and outer lip 420 of strongback clamping device 400 is disposed to lie at a radially interior position while inner lip 340 of hub clamp 220 is disposed to lie at a radially exterior position (in other words, outer lip 420 will lie radially between the pipe and inner lip 340). Accordingly, a pair of opposing strongback clamping devices 400 can be matingly connected to a pair of opposing enclosure halves 100 or 200 while the pair of opposing enclosure halves 100 or 200 is disposed circumferentially around the pipe, and a pair of opposing hub clamps 220 can be matingly connected to a pair of opposing strongback clamping devices 400 while the pair of opposing strongback clamping devices 400 is disposed circumferentially around the pipe. Thus, additional hub clamps and enclosure halves can be connected to pre-existing modular repair enclosures including strongback clamping devices 400 (e.g. enclosure half-strongback clamping device concatenations already attached to the pipe) and strongback clamping devices 400 can be connected to (enclosure halves of) pre-existing modular repair enclosures.

Turning now to FIG. 5, in accordance with some embodiments of the present disclosure, there is shown an unassembled modular repair enclosure including two sets of components, each set including two enclosure halves attached to a hub clamp therebetween. Specifically, enclosure half 1 500 and enclosure half 2 505 are both matingly connected to hub clamp Hub Clamp1 220 at respective side portions or hubs 310 thereof, and enclosure half 3 505 and enclosure half 4 500 are both matingly connected to hub clamp Hub Clamp2 220 at respective side portions or hubs 310 thereof. The modular repair enclosure includes sealant 510 along grooves and contains a pipe 520. Enclosure half 1 500 and enclosure half 4 500 each include a void section 108, pipe retainer sections 120, two axially opposite end portions or hubs 102, outer lips 150, primary groove 110, angled grooves 105 and clamping holes 115. Enclosure half 2 505 and enclosure half 3 505 each include a void section 108, pipe retainer sections 120, two axially opposite end portions or hubs 102, outer lips 150, angled grooves 105 and clamping holes 115 but include only end portions of a primary groove (not labeled in FIG. 5, but visible in enclosure half 2 505 as containing sealant) in accordance with the embodiment of the present disclosure shown in FIG. 5. It is noted that the two axially opposite end portions or hubs 102 of enclosure half 1 500, enclosure half 2 505, enclosure half 3 505 or enclosure half 4 500 may collectively be referred to as a single (combined) end portion. Enclosure half 1 500, Hub Clamp1 220, and enclosure half 2 505 are positioned over enclosure half 3 505, Hub Clamp2 220, and enclosure half 4 500, respectively, around the pipe. Clamping holes are aligned and fasteners such as clamping bolts and nuts (not shown in FIG. 5) are attached to complete assembly of the modular repair enclosure (completed assembly not shown in FIG. 5). Sealant 510 is then injected through a number of injection points (not shown in FIG. 5) provided in the modular repair enclosure, which injection points may be connected directly to primary grooves 110. In accordance with some embodiments of the present disclosure, the sealant 510 may be a Teflon™ fiber sealant. Primary grooves 110 and those angled grooves 105 containing sealant 510 in each enclosure half (i.e. angled grooves 105 that are adjacent to clamp1 220 or clamp2 220) and sealant groove 320 (see FIG. 3) in each hub clamp of the modular repair enclosure provide a continuous seal around the pipe, stopping the leaks in the pipe.

Figure 6:
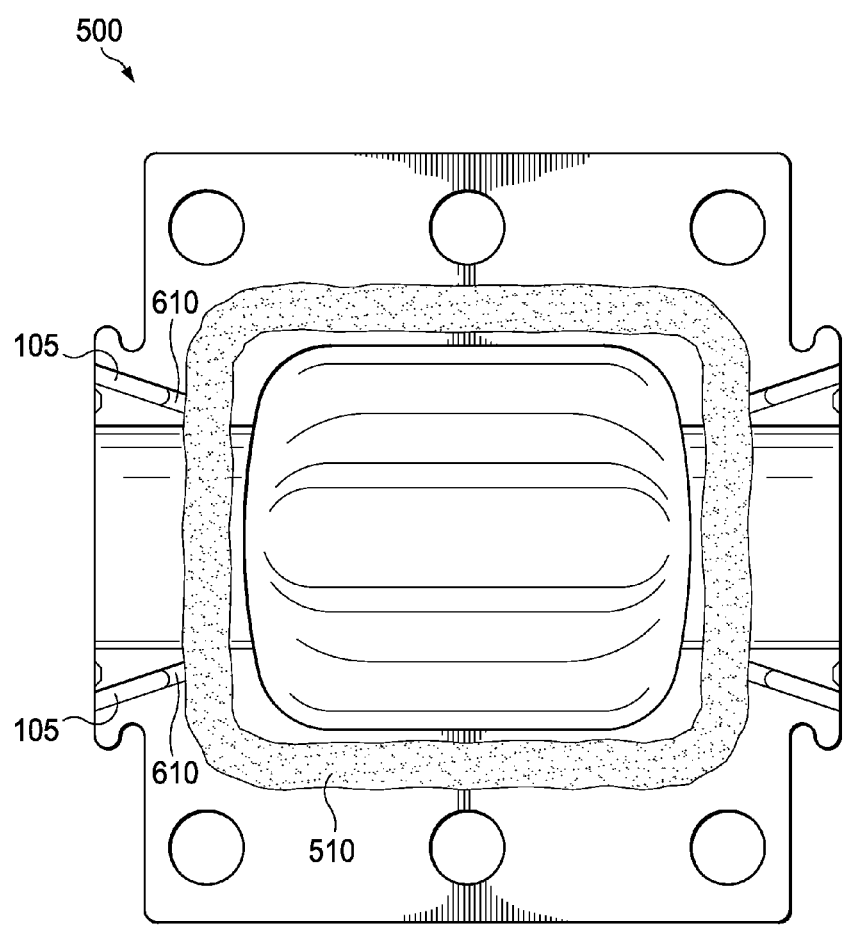
FIG. 6, in accordance with some embodiments of the present disclosure, shows a more detailed view of one enclosure half, including angled grooves, of the modular repair enclosure of FIG. 5.
Figure 11:
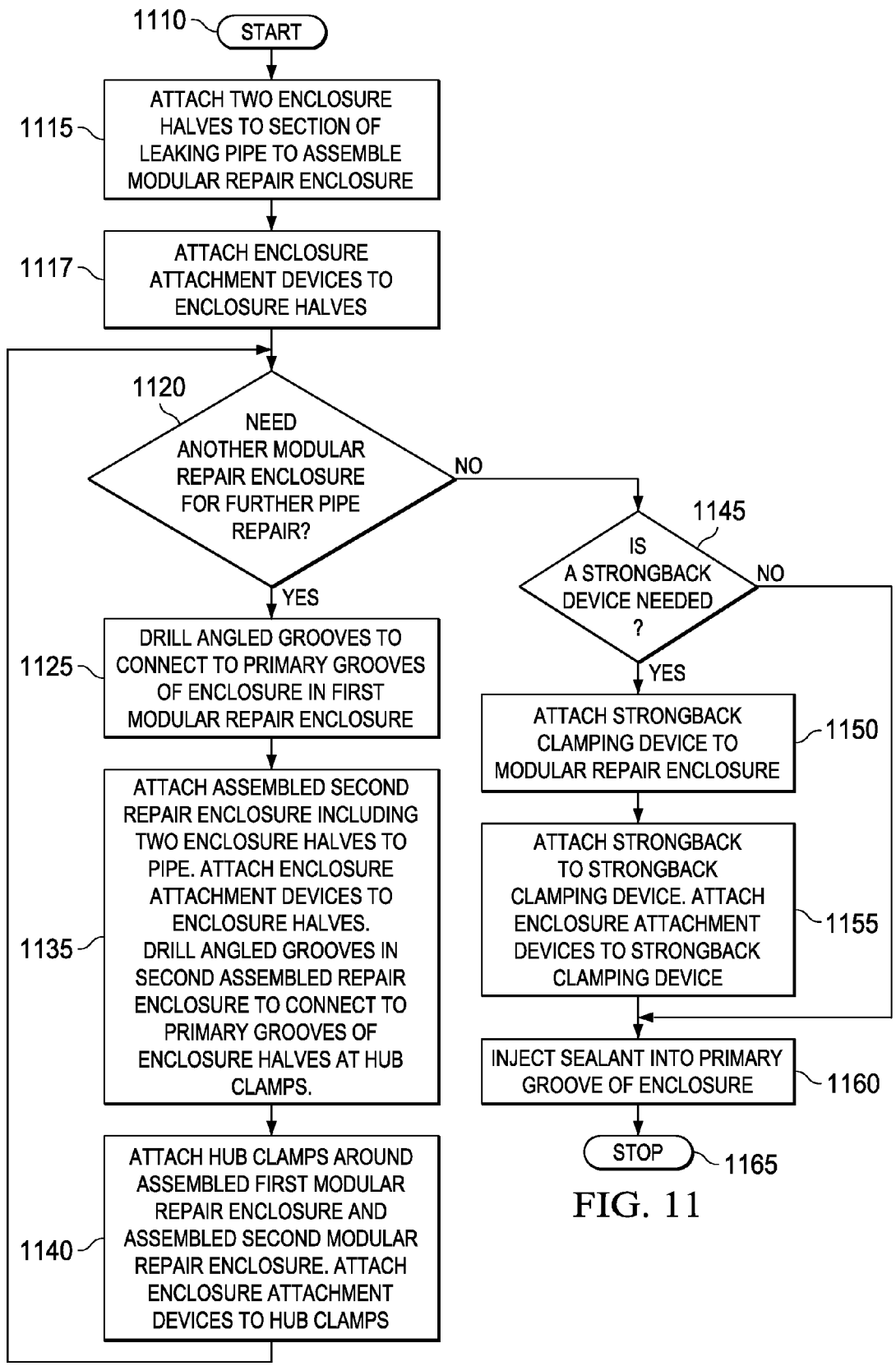
FIG. 11, in accordance with some embodiments of the present disclosure, is a flow chart showing installation of modular repair enclosures to repair pipe leaks.

FIG. 6 shows a more detailed view of enclosure half 500 of the modular repair enclosure of FIG. 5. Sealant 510 injected into the primary groove 110 is visible in FIG. 6. As shown in FIG. 11 and described in more detail below, after the enclosure halves have been attached to complete assembly of the modular repair enclosure, a drill with drill bit of diameter 3/16 inch and length 3/4 inch is used in the angled groove 105 to drill a drill hole passage 610. That is, each angled groove 105 is initially formed as a blind hole (as seen e.g. in FIG. 5 in the hubs 102 of enclosure half 2 505 and enclosure half 3 505 that are not adjacent to hub clamp 220); by drilling drill hole passage 610 at the end of angled groove 105, angled groove 104 is rendered a through hole (as seen e.g. in FIG. 6). Thus, drill hole passage 610 connects the angled groove 105 to the primary groove 110 and allows sealant to travel from one enclosure half to the next enclosure half across the hub clamp 220 (via sealant groove 320), as shown in FIG. 5 for the modular repair enclosure illustrated therein, in which each of the two hub clamps 220 is matingly connected to an enclosure half at either side portion or hub 310 thereof. With regard to the enclosure halves, it is noted that no drill hole passages have been drilled in those of the axially opposite end portions or hubs 102 thereof that are not matingly connected to a hub clamp (i.e. at the upper ends of enclosure half 1 500 and enclosure half 3 505, and the lower ends of enclosure half 2 505 and enclosure half 4 500, as shown in FIG. 5).

The term "blind hole" is used in the immediately preceding discussion and throughout the entirety of this document to mean a hole that extends to a certain depth in but does not go all the way through the substrate, i.e. does not break through to the other side of the substrate, while the term "through hole" is used herein to mean a hole that goes all the way through the substrate, i.e. breaks through to the other side of the substrate. In the case of this disclosure, 'breaking through to the other side of the substrate' means breaking through to the portion of primary groove 110 that is closest to the bottom or closed end (i.e. prior to drilling) of the angled groove 105 in question.

Figure 7:
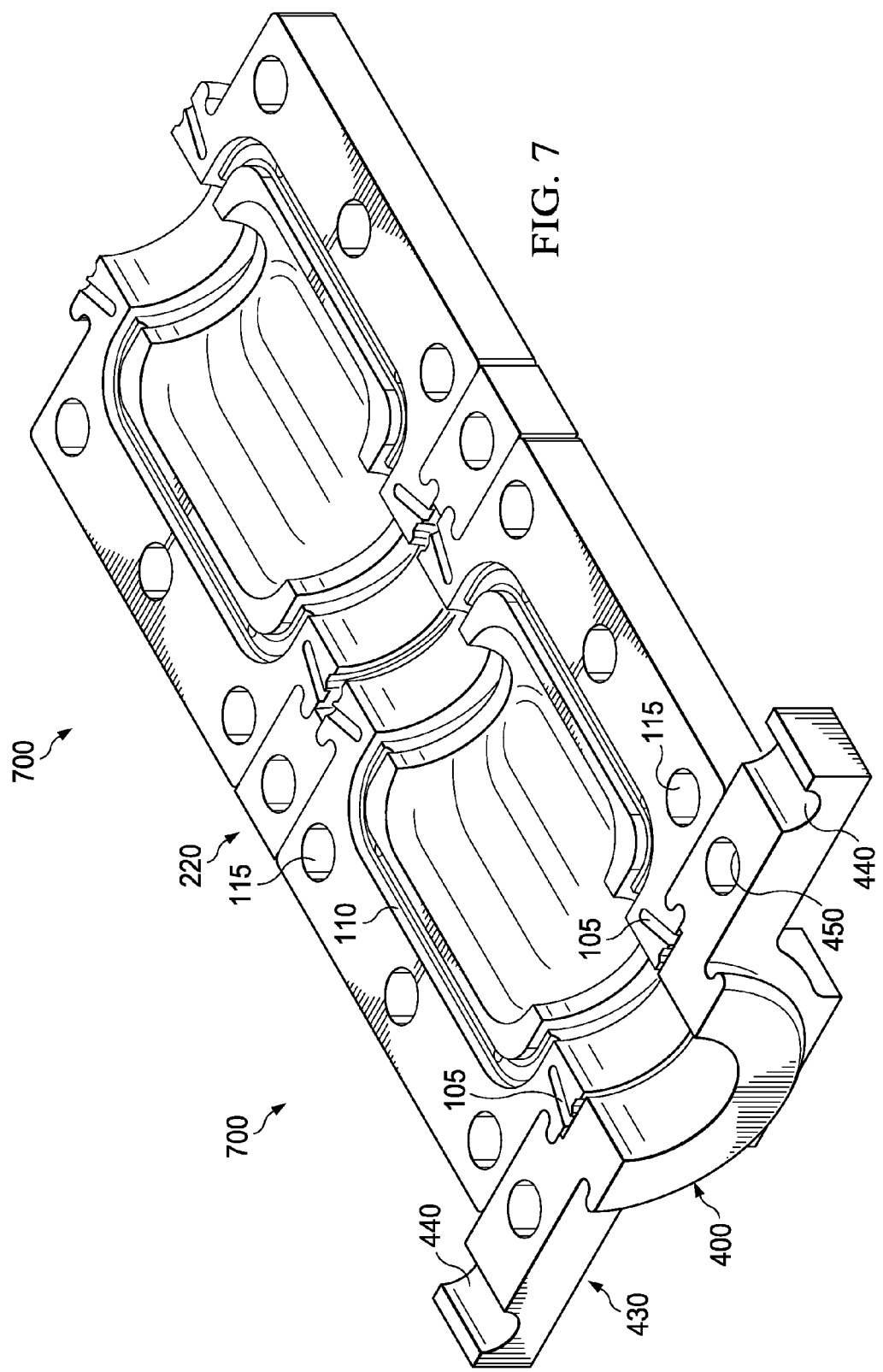
FIG. 7, in accordance with some embodiments of the present disclosure, shows two enclosure halves attached by a hub clamp therebetween, with one of the enclosure halves being attached to a strongback clamping device at the end opposite the end attached to the hub clamp.

Referring now to FIG. 7, there are shown two enclosure halves 700 attached by a hub clamp 220 therebetween, with one of the enclosure halves 700 being attached in addition (at its other end) to a strongback clamping device 400. Thus, strongback clamping device 400 is attached to the enclosure half 700 at the axially opposite end portion or hub thereof that is opposite the axially opposite end portion or hub thereof that is attached to hub clamp 220. Put another way, FIG. 7 shows a concatenation of enclosure half-hub clamp-enclosure half-strongback clamping device. In accordance with some embodiments of the preferred disclosure, the strongback clamping device 400 includes strongback holders 440 and clamping holes 450. The strongback holders 440 retain strongback rods (not shown in FIG. 7) to maintain structural integrity of the pipeline if so needed. The angled grooves 105 that are adjacent strongback clamping device 400 are not drilled all the way to the primary groove 110 as a second enclosure half is not attached (via a hub clamp 220) to the strongback clamping device 400 on the side of side portion or hub 430; rather, side portion or hub 430 is a free end of strongback clamping device 400, as shown in FIG. 7. In accordance with some embodiments of the preferred disclosure as shown in FIG. 7, the strongback clamping device 400 does not include angled grooves or primary grooves. Thus, sealant does not have to flow from primary groove 110 of enclosure half 700 through angled grooves 105 to strongback clamping device 400, and another drilling of the angled grooves 105 is not required. In normal use of a modular repair enclosure, drill hole passages would be drilled in the angled grooves 105 in each enclosure half 700 that are adjacent to hub clamp 220, connecting those angled grooves 105 to respective primary grooves 110, as described with reference to FIG. 6, although this is not shown in FIG. 7.

Figure 13:
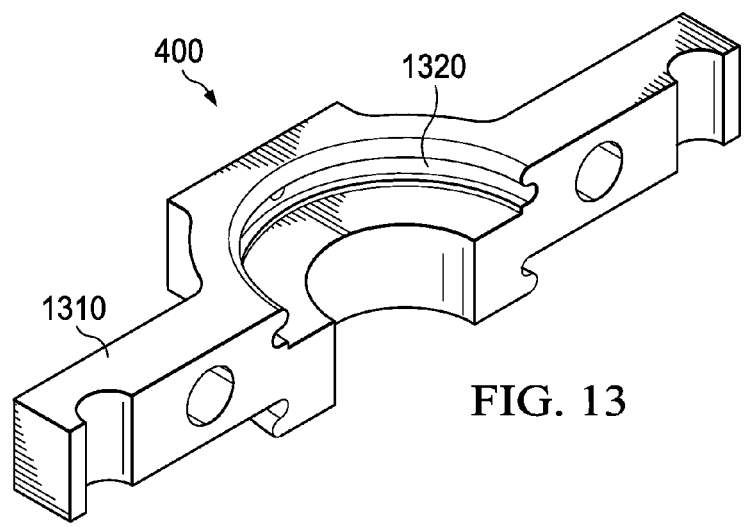

A more detailed view of the strongback clamping device 400 of FIG. 7 is shown in FIG. 13. As discussed, inner lip 1320 of the strongback clamping device 400 is capable of matingly connecting with the outer lip 150 of the enclosure halves 100, 200 of FIGS. 1-2.

Turning now to FIG. 8, an assembled modular repair enclosure including two enclosure halves 800 joined together is shown. As shown in FIG. 8, enclosure halves 800 constitute a pair of opposing enclosure halves that are disposable circumferentially around a pipe (see e.g., FIG. 5), each of the two enclosure halves 800 individually being disposable partially circumferentially, e.g. in the illustrated embodiment semi-circumferentially, around the pipe. In accordance with some embodiments of the preferred disclosure, the void or opening formed by the void sections (not visible in FIG. 8) and pipe retainer sections 820 of enclosure halves 800 is capable of holding a 2 inch diameter pipe section (not shown in FIG. 8) of the pipeline. In accordance with other embodiments, modular repair enclosures may also be designed that can hold various different diameters of pipe. The outer lip 840 attaches to the inner lip 340 of a hub clamp 220 as shown in FIG. 3 or to inner lip 1320 of strongback clamping device 400 as shown in FIG. 13. As shown in FIG. 11 and described more specifically below, after the modular repair enclosure formed by the two enclosure halves 800 is placed around the leaking pipe, enclosure attachment devices are attached and, if further sections of the pipe are leaking, the angled grooves 850 are drilled to connect the angled grooves 850 to the primary grooves (not shown in FIG. 8), a second modular repair enclosure is placed around the leaking pipe, additional enclosure attachment devices are attached, the appropriate angled grooves in the second modular repair enclosure are drilled, hub clamps 220 and, if necessary, a strongback clamping device 400 and a strongback rod are attached, and additional enclosure attachment devices are attached for the hub clamps and the strongback clamping device (if present).

Figure 9:
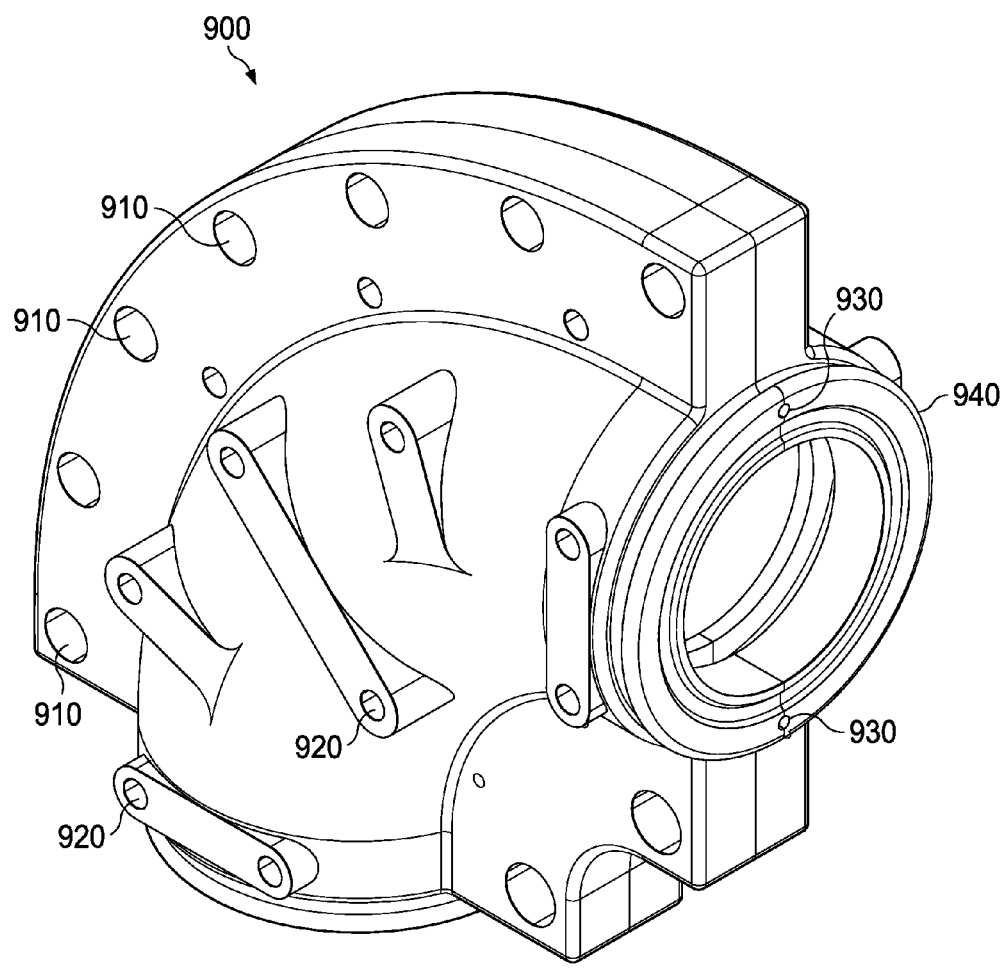
FIG. 9, in accordance with some embodiments of the present disclosure, is a schematic of an assembled elbow pipe repair enclosure.

Turning now to FIG. 9, in accordance with some embodiments of the present disclosure, a schematic of assembled elbow modular pipe repair enclosure 900, made up of two elbow enclosure halves, is shown. An elbow section of pipe (not shown in FIG. 9) of 2 inch diameter in the pipeline that is leaking may be repaired by enclosing the elbow section of pipe in the elbow modular pipe repair enclosure 900. As shown in FIG. 9, the elbow modular pipe repair enclosure 900 includes clamping holes 910, sealant injection points 920, angled grooves 930 and outer lip 940 for connection to hub clamp 220 or strongback clamping device 400.

Figure 10A:
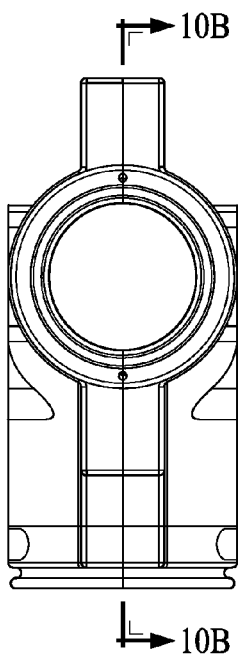
FIG. 10A, in accordance with some embodiments of the present disclosure, shows a first view of the elbow pipe repair enclosure.
Figure 10B:
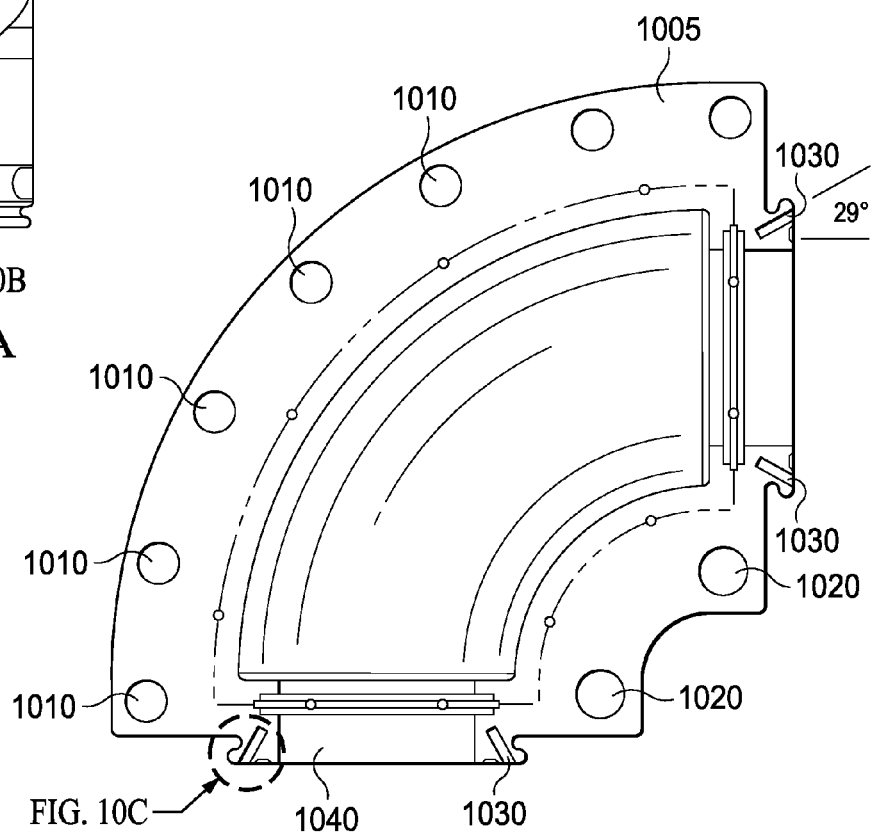
FIG. 10B, in accordance with some embodiments of the present disclosure, shows a view of the elbow pipe repair enclosure of FIG. 10A taken along the line 10B-10B.
Figure 10C:
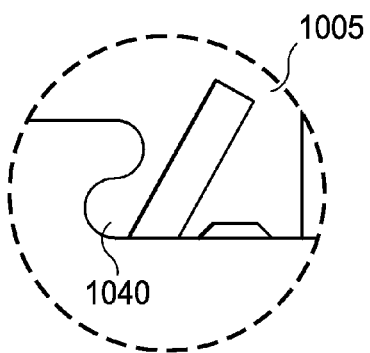
FIG. 10C, in accordance with some embodiments of the present disclosure, shows a detailed view of a portion of elbow pipe repair enclosure of FIG. 10B, as indicated by the dashed circle in FIG. 10B.

FIG. 10A shows a first view looking at the 2 inch pipe retainer section of the elbow pipe repair enclosure 900. In accordance with some embodiments of the present disclosure, the 2 enclosure halves of the elbow modular pipe repair enclosure have a diameter width of 5½ inches. FIG. 10B shows a view of the elbow modular pipe repair enclosure of FIG. 10A taken along the line 10B-10B. In accordance with some embodiments of the present disclosure, the clamping hole1 1010 is ¾ inch in diameter for ⅝ inch clamping bolt and clamping hole2 1020 is ⅞ inch in diameter for ¾ inch clamping bolt. The angled groove 1030 is offset at an angle of 29 degrees from the longitudinal axis of a pipe (not shown) entering the elbow modular pipe repair enclosure at the opening thereof closest to the same angled groove 1030 (or 29 degrees from the horizontal as seen at the top of the elbow modular pipe repair enclosure in FIG. 10B, and 29 degrees from the vertical as seen at the bottom of the elbow modular pipe repair enclosure in FIG. 10B), to allow an operator to place the drill in the angled groove 1030 unobstructed by the pipe and drill the drill hole passage during installation of modular pipe repair enclosure, while enclosure half 1005 is disposed around the pipe. FIG. 10C shows a detailed view of a portion of FIG. 10B including a portion of enclosure half 1005, a portion of outer lip 1040, and angled groove 1030 of the elbow pipe repair enclosure 900. It is noted that this feature whereby the angled groove is offset at an angle of 29 degrees from the longitudinal axis of a pipe may also be applied to other embodiments set forth herein, e.g. in the case of repairing a leak along a straight section of pipe.

Referring now to FIG. 11, a flow chart illustrating a method or process for repairing leaks in pipes by installation of modular repair enclosures in accordance with some embodiments of the present disclosure is shown. In step 1115, two enclosure halves are placed opposite each other, in the manner shown in FIG. 8, around a section of leaking pipe to assemble a modular repair enclosure. In step 1117, enclosure attachment devices, that is, fasteners such as clamping bolts or clamping studs, are placed into respective clamping holes for attachment of the enclosure halves in the first modular repair enclosure. An operator or technician using detection tools in step 1120 determines if more leaks are present in the pipe and another modular repair enclosure is needed for repair. If further pipe repairs are needed, in step 1125 the operator or technician drills a drill hole passage in each of the angled grooves in the axially opposite end portions or hubs that will be adjacent the hub clamps that will be inserted to accommodate enclosure halves of a second modular repair enclosure; the drill hole passages serve to connect these angle groves to primary grooves of the respective same enclosure halves in the modular repair enclosure. In step 1135, the second assembled modular repair enclosure including two enclosure halves, disposed opposite each other in the manner shown in FIG. 8, is placed over the pipe. Enclosure attachment devices, that is, fasteners such as clamping bolts or clamping studs, are placed into respective clamping holes for attachment of the enclosure halves in the second modular repair enclosure. Drill hole passages are drilled in the angled grooves in the axially opposite end portions or hubs (of the enclosure halves of the second modular repair enclosure) that will be adjacent the hub clamps that will be connected to the enclosure halves of the second assembled modular repair enclosure. Again, the drill holes connect these angled grooves to the primary grooves of the respective same enclosure halves in the second assembled modular repair enclosure. In step 1140 a pair of opposing hub clamps is disposed around the pipe and connected to the first and second assembled modular repair enclosures, which are disposed circumferentially around the pipe so as to cover the leaks in the pipe; the hub clamps are attached using enclosure attachment devices, which are placed in the hub clamps. The enclosure attachment devices are fasteners, such as clamping bolts or clamping studs, which are placed into respective clamping holes of the hub clamps. Returning to step 1120, the operator or technician determines if more leaks are present in the pipe and another modular repair enclosure is needed. If no further leaks are present in the pipe and a strongback device is not needed 1145, in step 1160, sealant is injected into injection points connected to primary grooves and angled grooves of the modular repair enclosure. If no further leaks are present in the pipe but a strongback device is needed to reinforce the structural integrity of the pipe in step 1145, then strongback clamping devices as shown in FIGS. 4, 7 and 13 are used to assemble strongback modular repair enclosure. In step 1150, the strongback clamping devices are disposed around the pipe and connected to the modular repair enclosure. In step 1155, strongback rods ("strongbacks") are placed into strongback holders in the strongback modular repair device. After the strongbacks have been attached to the strongback modular repair enclosure, the strongback clamping devices are attached using enclosure attachment devices, that is, fasteners such as clamping bolts or clamping studs, that are placed into respective clamping holes of the strongback clamping devices for attachment thereof. Then, in step 1160, sealant is injected into injection points connected to primary grooves and angled grooves of the modular repair enclosure(s). Installation of modular repair enclosures to repair pipe leaks in the pipeline is complete and the method stops in step 1165. Steps 1145, 1150, and 1155 may be performed as a process separate from the other steps of FIG. 11, or at a time different from that at which the other steps of FIG. 11 are performed. It will be understood by one of ordinary skill in the art, in view of the remainder of this disclosure, that the order of certain of the steps of FIG. 11 may be varied.

Figure 12:
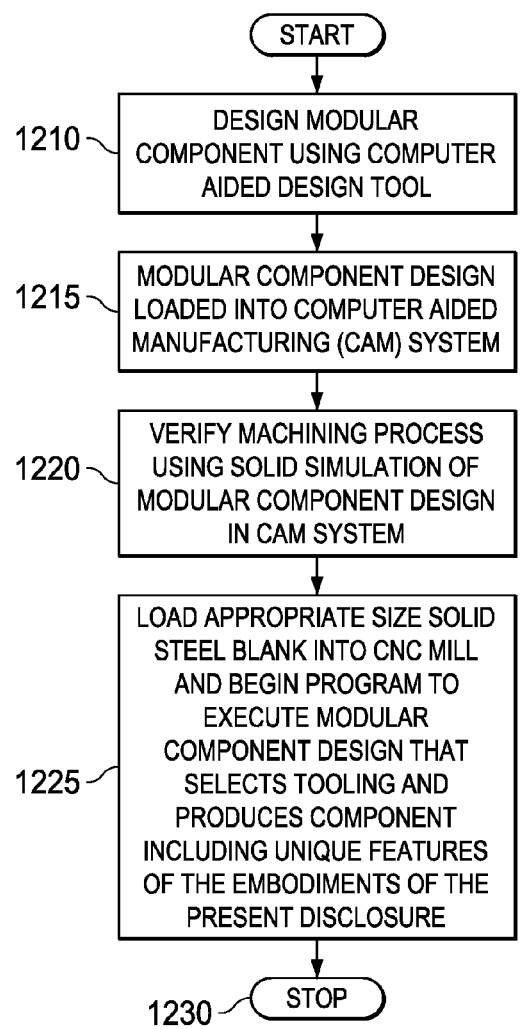
FIG. 12, in accordance with some embodiments of the present disclosure, is a flowchart showing manufacture of the modular components FIG. 13, in accordance with some embodiments of the present disclosure, shows a more detailed view of the strongback clamping device of FIGS. 4 and 7.

Turning now to FIG. 12, a flowchart for manufacture of modular components including enclosure halves, hub clamps, strongback clamping devices and so on for assembly of modular repair enclosures is shown. In step 1210, in accordance with some embodiments of the present disclosure, the given modular component is designed using SolidWorks™, a three dimensional Computer Aided Design (CAD) system. The modular component design is then sent to a Computer Aided Manufacturing (CAM) system in step 1215 that, in accordance with some embodiments of the present disclosure, includes the Esprit™ system that controls a computer numerical control (CNC) mill.

Esprit™ is a high performance CAM system for a full range of machine tool applications. Esprit™ delivers full-spectrum programming for 2-5 axis milling, 2-22 axis turning, 2-5 axis wire EDM, multitasking mill-turning machining, and B-axis machine tools. Esprit's™ capabilities include machining any part geometry (solid, surface or wireframe), universal post processing to format G-code for virtually any machine tool, and solid simulation and verification with dry runs rendered in dynamic solids for optimal part quality and consistency. Esprit's™ multitasking component provides capabilities for driving mill-turn machines, multi-axis lathes, and Swiss-style machine tools. Esprit™ provides synchronization of simultaneous cutting cycles using any combination of turrets and spindles for milling or turning, factory-certified post processors for all the leading multitasking machine tools, and dynamic solid simulations for dry run verification of the machining processes.

A machinist operator using Esprit™ CAM system or similar system verifies the machining process using solid simulation of the modular component design in step 1220. Finally, in step 1225, the appropriate size solid steel blank that may be 516-grade 70 steel is loaded into the CNC mill; Esprit™ or a similar system receives the modular component design as an input and initiates a program to execute the modular component design. The program selects the proper tooling in CNC mill and controls the CNC mill to produce the modular component that includes the unique features of the embodiments of the present disclosure.

According to various illustrative embodiments, a method and system is disclosed for encapsulating a leak in a pipeline component such as a coupling, elbow, center piece, T-piece, valve-piece, squiggly piece, flange enclosure, and so on. The method and system for encapsulating the leak in the pipeline includes injection of sealant in and around the leak to seal it off without taking the pipeline or component out of service. The system includes a modular repair enclosure that permits incorporation of a plurality of unique endplates which allows the modular repair enclosure to be added to at a later date if there is a need because of further deterioration in the pipeline or component. One endplate also allows installation of a safety strongback if the strongback is required to maintain structural integrity of the leaking pipeline. In accordance with some embodiments of the present disclosure, the endplate is a hub clamp, strongback clamping device or other clamping device. To achieve the add-on capability and built in strongback feature, the endplates of the modular repair enclosure include an outer lip and/or an inner lip in various combinations as described herein and as will be appreciated are possible by one of ordinary skill in the art. In accordance with some embodiments of the present disclosure, the endplate includes a sealant groove uniquely designed to provide a continuous seal from one modular repair enclosure to the next modular repair enclosure when injected with sealant through an injection point in the modular repair enclosure.

Manufacturing the modular repair enclosure comprising enclosures and endplates is substantially unique as compared with manufacturing of other pipeline repair devices. Previous pipeline repair devices were manufactured using components made from castings or by fabricating separate components and assembling the pipeline repair device by welding, drilling, machining and grinding each component as separate functions. In accordance with some embodiments of the present disclosure, each of the components of a modular repair enclosure is manufactured from a solid piece of 516-grade 70 steel. Manufacturing of the components may be performed by a CNC milling machine controlled by Esprit™ or similar software system.

The modular repair enclosure manufactured from solid pieces of steel has simplified material traceability as the enclosure is manufactured from only one material. Other pipeline repair enclosures require as many as eight material traceable records per enclosure that often have to be hand stamped on each material in the enclosure. Furthermore, the modular repair enclosure made of components each manufactured from a single solid piece of steel has no required welding and, thus, inspection procedures for the end user are greatly simplified as welder's qualifications do not need to be audited, welding procedures do not need to be approved, weld testing such as Nondestructive testing (NDT) or X-ray do not need to be carried out, and there are no dangers of casting flaws.

The particular embodiments disclosed above are illustrative only, as the present claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present claimed subject matter. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

What is claimed is:

1. A modular pipe repair enclosure system for repair of one or more leaks in a pipe, comprising:
    a plurality of enclosure halves, each enclosure half being disposable around a pipe, each enclosure half including a void portion that constitutes a void between the respective enclosure half and the pipe when the respective enclosure half is disposed around the pipe, the void portion being for covering one or more leaks in the pipe, and each enclosure half having an end portion, a plurality of first grooves in the end portion, and a second groove extending around the void portion;
    a plurality of hub clamps, each hub clamp being disposable around a pipe; and
    a plurality of enclosure attachment devices, for attaching the enclosure halves and for attaching the hub clamps,
    wherein the enclosure halves are connectable to the hub clamps,
    wherein, for each of the enclosure halves, the first grooves thereof are blind holes that may be rendered through holes communicating with the second groove thereof, such that sealant may flow between the first grooves thereof and the second groove thereof if the first grooves thereof have been rendered through holes, and
    wherein each of the hub clamps includes a third groove such that, when the respective hub clamp is connected to a given one of the enclosure halves, the third groove is in communication with ones of the first grooves of the given enclosure half, whereby sealant may flow between the third groove and the ones of the first grooves of the given enclosure half in communication with the third groove.

2. The modular pipe repair enclosure of claim 1,
    wherein, for each of the enclosure halves, the end portion includes axially opposite first and second end portions, and the plurality of first grooves includes a first plurality of first grooves in the first end portion and a second plurality of first grooves in the second end portion,
    wherein any given one of the enclosure halves, at either the first or second end portion thereof, may be connected to any given one of the hub clamps,
    wherein, for each of the hub clamps, when the respective hub clamp is connected to a given one of the enclosure halves at the first or second end portion thereof, respectively, the third groove is in communication with the first plurality of first grooves or the second plurality of first grooves, respectively, of the given enclosure half.

3. The modular pipe repair enclosure of claim 1,
    wherein, among the plurality of enclosure halves, each of the enclosure halves is disposable axially along and partially circumferentially around a pipe, such that a pair of opposing enclosure halves is disposable circumferentially around a pipe,
    wherein, among the plurality of hub clamps, each of the hub clamps is disposable axially along and partially circumferentially around a pipe, such that a pair of opposing hub clamps is disposable circumferentially around a pipe, and wherein the enclosure attachment devices are for attaching opposing ones of the enclosure halves and for attaching opposing ones of the hub clamps.

4. The modular pipe repair enclosure of claim, further comprising:

a plurality of strongback clamping devices, each of the strongback clamping devices being disposable around a pipe, and each of the strongback clamping devices having a plurality of strongback holders for holding strongback rods for enhancing structural integrity of the pipe; and an additional plurality of enclosure attachment devices, for attaching the strongback clamping devices, wherein the strongback clamping devices are connectable with the enclosure halves and with the hub clamps.

5. The modular pipe repair enclosure of claim 1, wherein, for each of the enclosure halves, the end portion includes axially opposite first and second end portions, each of the end first and second end portions including an outer lip, wherein each of the hub clamps has axially opposite first and second side portions, each of the side portions including an inner lip, and wherein the outer lips are matingly connectable to the inner lips, such that a given one of the enclosure halves, at either the first or second end portion thereof, may be matingly connected to a given one of the hub clamps, at either side portion thereof.

6. The modular pipe repair enclosure of claim 5, wherein the outer lips are disposed to lie at a radially interior position when the enclosure halves are disposed around a pipe, and the inner lips are disposed to lie at a radially exterior position when the hub clamps are disposed around a pipe, such that a given hub clamp can be matingly connected to a given enclosure half while the given enclosure half is disposed around a pipe.

7. The modular pipe repair enclosure of claim 5, further comprising:

a plurality of strongback clamping devices, each of the strongback clamping devices being disposable around a pipe, each of the strongback clamping devices having a plurality of strongback holders for holding strongback rods for enhancing structural integrity of the pipe, and each of the strongback clamping devices having axially opposite first and second side portions, the first side portion including an inner lip and the second side portion including an outer lip; and an additional plurality of enclosure attachment devices, for attaching the strongback clamping devices, wherein the inner lips of the strongback clamping devices are matingly connectable with the outer lips of the enclosure halves, and the outer lips of the strongback clamping devices are matingly connectable with the inner lips of the hub clamps, such that a given one of the strongback clamping devices, at the first side portion thereof, may be matingly connected to a given one of the enclosure halves at either the first or second end portion thereof, and a given one of the strongback clamping devices, at the second side portion thereof, may be matingly connected to a given one of the hub clamps at either side portion thereof.

8. The modular pipe repair enclosure of claim 1, wherein, for each of the enclosure halves, the first grooves are offset at an angle relative to a longitudinal axis of the pipe, permitting the first grooves to be drilled while the respective enclosure half is disposed around the pipe.

9. The modular pipe repair enclosure of claim 1, wherein the enclosure attachment devices are fasteners, and wherein each of the enclosure halves is provided with a plurality of clamping holes for inserting ones of the fasteners therein, respectively, for attaching the respective enclosure half, and wherein each of the hub clamps is provided with a plurality of clamping holes for inserting other ones of the fasteners therein, respectively, for attaching the respective hub clamp.

10. The modular pipe repair enclosure of claim 1, wherein each of the enclosure halves is provided with a plurality of injection points, communicating with the second groove thereof, for injecting therethrough sealant into the second groove thereof.

11. The modular pipe repair enclosure of claim 1, wherein the plurality of enclosure halves includes two enclosure halves formed in such a configuration as to be disposable around an elbow portion of a pipe.

12. The modular pipe repair enclosure of claim 1, wherein each of the enclosure halves and hub clamps is made of a single solid steel piece.

13. A method for repair of one or more leaks in a pipe, using a modular pipe repair enclosure system, the modular pipe repair enclosure system including:

a plurality of enclosure halves, each enclosure half being disposable around a pipe and being disposable as one of a pair of opposing enclosure halves disposable around a pipe, each enclosure half including a void portion that constitutes a void between the respective enclosure half and the pipe when the respective enclosure half is disposed around the pipe, the void portion being for covering one or more leaks in the pipe, each enclosure half having axially opposite first and second end portions, such that a pair of opposing enclosure halves disposed around the pipe has aligned respective first end portions and aligned respective second end portions, and each enclosure half having a first plurality of first grooves in the first end portion, a second plurality of first grooves in the second end portion, and a second groove extending around the void portion, a plurality of hub clamps, disposable as one or more pairs of opposing hub clamps extending around a pipe, and a plurality of enclosure attachment devices, for attaching the enclosure halves and for attaching the hub clamps, wherein the enclosure halves are connectable to the hub clamps, wherein, for each of the enclosure halves, the first grooves thereof are blind holes that may be rendered through holes communicating with the second groove thereof, such that sealant may flow between the first grooves thereof and the second groove thereof if the first grooves thereof have been rendered through holes, wherein each of the hub clamps includes a third groove such that, when the respective hub clamp is connected to a given one of the enclosure halves, the third groove is in communication with ones of the first grooves of the given enclosure half, whereby sealant may flow between the third groove and the ones of the first grooves of the given enclosure half in communication with the third groove, and wherein each of the enclosure halves is provided with a plurality of injection points, communicating with the second groove thereof, for injecting therethrough sealant into the second groove thereof, and the method comprising:

disposing a first pair of opposing enclosure halves around a first portion of a pipe containing a first leak, so as to cover the first leak by the void section of one of the opposing enclosure halves;

attaching the first pair of opposing enclosure halves, using ones of the enclosure attachment devices;

determining if a second pair of opposing enclosure halves is needed to cover a second leak in the pipe, wherein if a second pair of opposing enclosure halves is not needed:

for each of the first pair of opposing enclosure halves, injecting sealant into the plurality of injection points thereof, such that the sealant flows into the second groove thereof, and if a second pair of opposing enclosure halves is needed:

from among the end portions of the first pair of opposing enclosure halves, identifying the end portion that is closest to the second leak to be covered and the end portion aligned therewith as first and second target end portions, respectively;

for each of the first grooves in the first target end portion, rendering the blind hole thereof a through hole by drilling a drill hole passage therein so as to connect the respective first groove to the second groove of the enclosure half having the first target end portion;

for each of the first grooves in the second target end portion, rendering the blind hole thereof a through hole by drilling a drill hole passage therein so as to connect the respective first groove to the second groove of the enclosure half having the second target end portion;

disposing a second pair of opposing enclosure halves around a second portion of the pipe containing the second leak, so as to cover the second leak by the void section of one of the enclosure halves of the second pair of opposing enclosure halves;

attaching the second pair of opposing enclosure halves, using additional ones of the enclosure attachment devices;

from among the end portions of the second pair of opposing enclosure halves, identifying, as third and fourth target end portions, the end portions that are closest to the first pair of opposing enclosure halves when the first pair of opposing enclosure halves is disposed around the first portion of the pipe containing the first leak so as to cover the first leak and the second pair of opposing enclosure halves is disposed around the second portion of the pipe containing the second leak so as to cover the second leak;

for each of the first grooves in the third target end portion, rendering the blind hole thereof a through hole by drilling a drill hole passage therein so as to connect the respective first groove to the second groove of the enclosure half having the third target end portion;

for each of the first grooves in the fourth target end portion, rendering the blind hole thereof a through hole by drilling a drill hole passage therein so as to connect the respective first groove to the second groove of the enclosure half having the fourth target end portion;

connecting a pair of opposing hub clamps to the first pair of opposing enclosure halves and to the second pair of opposing enclosure halves, such that the third grooves of the hub clamps are put in communication with the drilled first grooves of the first and second pairs of opposing enclosure halves and, thereby, in communication with the second grooves of the first and second pairs of opposing enclosure halves, whereby sealant, when present in the third grooves of the hub clamps, the drilled first grooves of the first and second pairs of opposing enclosure halves, or the second grooves of the first and second pairs of opposing enclosure halves, may flow between the third grooves of the hub clamps, the drilled first grooves of the first and second pairs of opposing enclosure halves, and the second grooves of the first and second pairs of opposing enclosure halves;

attaching the pair of opposing hub clamps, using still additional ones of the enclosure attachment devices; and for each enclosure half of the first and second pairs of opposing enclosure halves, injecting sealant into the plurality of injection points thereof, such that the sealant flows into the second groove thereof.

14. The method of claim 13, wherein the modular pipe repair enclosure system further includes:

a plurality of strongback clamping devices, disposable as one or more pairs of opposing strongback clamping devices extending around a pipe, each of the strongback clamping devices having a plurality of strongback holders for holding strongback rods for enhancing structural integrity of the pipe, and an additional plurality of enclosure attachment devices, for attaching the strongback clamping devices, wherein the strongback clamping devices are connectable with the enclosure halves and the hub clamps, the method further comprising:

determining if a strongback rod is needed for enhancing structural integrity of the pipe, wherein if a strongback rod is needed:

a pair of opposing strongback clamping devices is connected to the first or second pair of opposing enclosure halves;

a strongback rod is attached to one of the pair of opposing strongback clamping devices; and the pair of opposing strongback clamping devices is attached, using the additional plurality of enclosure attachment devices.

15. The method of claim 13, wherein, in the modular pipe repair enclosure system, (a) for each of the enclosure halves, each of the end portions thereof includes an outer lip, (b) each of the hub clamps has axially opposite first and second side portions, each of the side portions including an inner lip, and (c) the outer lips are matingly connectable to the inner lips, such that a given one of the enclosure halves, at either end portion thereof, may be matingly connected to a given one of the hub clamps, at either side portion thereof, and wherein, in the method, the connecting of the pair of opposing hub clamps to the first pair of opposing enclosure halves and to the second pair of opposing enclosure halves is performed by matingly connecting the inner lips of the pair of opposing hub clamps to the outer lips of the first pair of opposing enclosure halves and the outer lips of the second pair of opposing enclosure halves.

16. The method of claim 15, wherein the modular pipe repair enclosure system further includes:

a plurality of strongback clamping devices, disposable as one or more pairs of opposing strongback clamping devices extending around a pipe, each of the strongback clamping devices having a plurality of strongback holders for holding strongback rods for enhancing structural integrity of the pipe, and each of the strongback clamping devices having axially opposite first and second side portions, the first side portion including an inner lip and the second side portion including an outer lip, and an additional plurality of enclosure attachment devices for attaching the strongback clamping devices, wherein the inner lips of the strongback clamping devices are matingly connectable with the outer lips of the enclosure halves, and the outer lips of the strongback clamping devices are matingly connectable with the inner lips of the hub clamps, such that a given one of the strongback clamping devices, at the first side portion thereof, may be matingly connected to a given one of the enclosure halves at either end portion thereof, and a given one of the strongback clamping devices, at the second side portion thereof, may be matingly connected to a given one of the hub clamps at either side portion thereof, the method further comprising:

determining if a strongback rod is needed for enhancing structural integrity of the pipe, wherein if a strongback rod is needed:

a pair of opposing strongback clamping devices is connected to the first or second pair of opposing enclosure halves by matingly connecting the inner lips of the strongback clamping devices with the outer lips of the first or second pair of opposing enclosure halves;

a strongback rod is attached to one of the pair of opposing strongback clamping devices; and the pair of opposing strongback clamping devices is attached, using the additional plurality of enclosure attachment devices.

17. The method of claim 13, wherein, in the modular pipe repair enclosure system, the enclosure attachment devices are fasteners, and each of the enclosure halves is provided with a plurality of clamping holes for inserting ones of the fasteners therein, respectively, for attaching the respective enclosure half, and each of the hub clamps is provided with a plurality of clamping holes for inserting other ones of the fasteners therein, respectively, for attaching the respective hub clamp, and wherein, in the method, the attaching of the first pair of opposing enclosure halves, the second pair of opposing enclosure halves, and the pair of opposing hub clamps is performed by inserting the fasteners in the clamping holes, respectively, of the first pair of opposing enclosure halves, the second pair of opposing enclosure halves, and the pair of opposing hub clamps.

18. The method of claim 13, wherein the sealant is a Teflon™ fiber sealant.

19. The method of claim 13, wherein the first or second pair of opposing enclosure halves is disposed around an elbow portion of a pipe containing a leak, so as to cover the leak.

* * * * *